United States Patent

Aoshima et al.

[11] Patent Number: 6,046,892
[45] Date of Patent: Apr. 4, 2000

[54] MAGNETORESISTIVE HEAD WITH IMPROVED UNDERLAYER

[75] Inventors: Kenichi Aoshima, Atsugi; Hitoshi Kanai, Isehara, both of Japan

[73] Assignee: Fujitsu Limited, Kawasaki, Japan

[21] Appl. No.: 09/040,048

[22] Filed: Mar. 17, 1998

[30] Foreign Application Priority Data

Oct. 1, 1997 [JP] Japan .................................. 9-268811

[51] Int. Cl.$^7$ ...................................................... G11B 5/39
[52] U.S. Cl. ................................................................ 360/113
[58] Field of Search ............................................ 360/113

[56] References Cited

U.S. PATENT DOCUMENTS

| | | | |
|---|---|---|---|
| 4,782,413 | 11/1988 | Howard et al. | 360/113 |
| 4,809,109 | 2/1989 | Howard et al. | 360/113 |
| 5,114,800 | 5/1992 | Shimizu et al. | 360/113 |
| 5,287,238 | 2/1994 | Baumgart et al. | 360/113 |
| 5,473,492 | 12/1995 | Terunuma et al. | 360/113 |
| 5,508,866 | 4/1996 | Gill et al. | 360/113 |
| 5,574,605 | 11/1996 | Baumgart et al. | 360/113 |
| 5,608,593 | 3/1997 | Kim et al. | 360/113 |
| 5,637,235 | 6/1997 | Kim et al. | 216/22 |
| 5,731,936 | 3/1998 | Lee et al. | 360/113 |
| 5,796,560 | 8/1998 | Saito et al. | 360/113 |
| 5,818,684 | 10/1998 | Iwasaki et al. | 360/113 |
| 5,850,323 | 12/1998 | Kanai | 360/113 |
| 5,949,622 | 9/1999 | Kamiguchi et al. | 360/113 |

FOREIGN PATENT DOCUMENTS

| | | |
|---|---|---|
| 6-76247 | 3/1994 | Japan . |
| 6-177453 | 6/1994 | Japan . |
| 6-349030 | 12/1994 | Japan . |
| 7-14125 | 1/1995 | Japan . |
| 8-315326 | 11/1996 | Japan . |

*Primary Examiner*—Craig A. Renner
*Attorney, Agent, or Firm*—Greer, Burns & Crain, Ltd.

[57] ABSTRACT

A magnetoresistive head includes an underlayer composed of one of Ni and NiFe alloy and at least one additive selected from the group consisting of Cr, Nb, Rh, and Pd. An anti-ferromagnetic layer is formed on the underlayer, and a first ferromagnetic layer is formed on the anti-ferromagnetic layer. The magnetic head also includes a nonmagnetic layer formed on the first ferromagnetic layer, and a second ferromagnetic layer formed on the nonmagnetic layer.

16 Claims, 4 Drawing Sheets

MAGNETORESISTIVE HEAD WITH IMPROVED UNDERLAYER

This invention relates generally to a thin film magnetic head, and more particularly, to a magnetoresistive transducer having an anti-ferromagnetic layer.

BACKGROUND OF THE INVENTION

One type of magnetoresistive head known as a spin-valve type magnetoresistive head includes a magnetoresistive element, which generally consists of a first ferromagnetic layer, a nonmagnetic intermediate layer and a second ferromagnetic layer (this type of magnetoresistive head is disclosed, for example, in U.S. Pat. No. 4,949,039). The electric resistance of the magnetoresistive element changes in accordance with the angle difference between the magnetic directions of the first and the second ferromagnetic layers.

In a typical spin-valve type magnetoresistive head, one of the two ferromagnetic layers serves as a pinned layer and is fixedly magnetized by the magnetic exchange coupling of an anti-ferromagnetic layer formed directly on the pinned layer. The other ferromagnetic layer typically serves as a free layer and is initially magnetized perpendicular to the magnetization direction of the pinned layer. The magnetization direction of the free layer then rotates towards or away from the magnetization direction of the pinned layer under the influence of the magnetic field from a recording medium, thereby changing the electric resistance of the magnetoresistive element in the head.

In commonly assigned U.S. Pat. No. 5,850,323 issued on Dec. 15, 1998, the magnetoresistive element of a head is described as having a Ta bottom underlayer, a NiFe underlayer, a NiMn anti-ferromagnetic layer, a NiFe pinned layer, a Cu nonmagnetic intermediate layer, and a NiFe free layer formed in the given order on a substrate. This arrangement in which a NiFe compound is used as the underlayer for the anti-ferromagnetic layer has two disadvantages with the increase in the recording density of the recording medium.

One problem is the current loss caused by the anti-ferromagnetic layer and the NiFe underlayer. As the magnetic field from the recording media is lowered by high-density recording, the amount of current change in the magnetoresistive element resulting from the magnetoresistive effect is also lowered. The anti-ferromagnetic layer and the NiFe underlayer do not contribute in producing the magnetoresistive effect, and therefore, any current loss through these layers results in an inefficient magnetoresistive effect.

Another problem is the deterioration of bias characteristics of the magnetoresistive head. The magnetic field generated by the sense current of the magnetoresistive head tends to magnetize the NiFe underlayer in the same direction as the pinned layer. As a result, the free layer is affected by the magnetostatic coupling of not only the pinned layer, but also by the NiFe underlayer. This prevents the magnetization directions of the free and the pinned layers from moving in desired angles, which deteriorates the bias characteristics.

Thus, there is a need for a magnetoresistive head having an efficient magnetoresistive effect and good bias characteristics.

Accordingly, one object of this invention is to provide a new and improved magnetoresistive head which prevents current loss in the anti-ferromagnetic layer and the underlayer that do not contribute to the magnetoresistive effect.

Another objective of this invention is to provide a new and improved magnetoresistive head which prevents the underlayer of the anti-ferromagnetic layer from affecting the magnetic direction of the free layer.

BRIEF SUMMARY OF THE INVENTION

In keeping with one aspect of this invention, a magnetoresistive head includes a substrate and an underlayer formed on the substrate. The underlayer is composed of one of Ni and NiFe alloy and at least one additive selected from the group consisting of Cr, Nb, Rh, and Pd. An anti-ferromagnetic layer is formed on the underlayer, and a first ferromagnetic layer is formed on the anti-ferromagnetic layer. The magnetic head also includes a nonmagnetic layer formed on the first ferromagnetic layer, and a second ferromagnetic layer formed on the nonmagnetic layer.

According to another aspect of this invention, a magnetoresistive head includes a substrate and an underlayer formed on the substrate. The underlayer has a resistivity of at least 60 $\mu\Omega$cm and a maximum saturation magnetic flux density of approximately 6,000 gauss. Also included is an anti-ferromagnetic layer composed of PdPtMn ordered-alloy formed on the underlayer, and a first ferromagnetic layer formed on the anti-ferromagnetic layer. A nonmagnetic layer is formed on the first ferromagnetic layer, and a second ferromagnetic layer is formed on the nonmagnetic layer.

According to yet another aspect of this invention, a magnetoresistive head includes a substrate and a Ta first underlayer formed on the substrate. A second underlayer composed of NiFeCr alloy is formed on the first underlayer. Also included is an anti-ferromagnetic layer, which is composed of PdPtMn ordered-alloy, formed on the second underlayer. Further, a first ferromagnetic layer is formed on the anti-ferromagnetic layer, a nonmagnetic layer is formed on the first ferromagnetic layer, and a second ferromagnetic layer is formed on the nonmagnetic layer.

BRIEF DESCRIPTION OF THE DRAWINGS

The above-mentioned and other features of this invention and the manner of obtaining them will become more apparent, and will be best understood by reference to the following description, taken in conjunction with the accompanying drawings in which.

DETAILED DESCRIPTION

Figure 1:
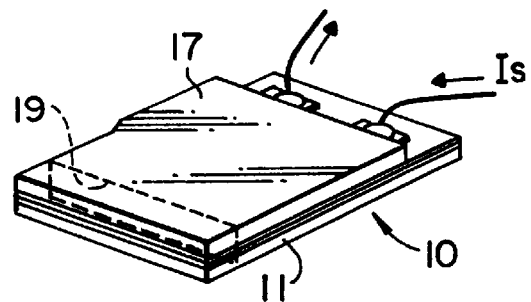
FIG. 1 is a perspective view of a magnetoresistive head made in accordance with the principles of this invention.
Figure 2:
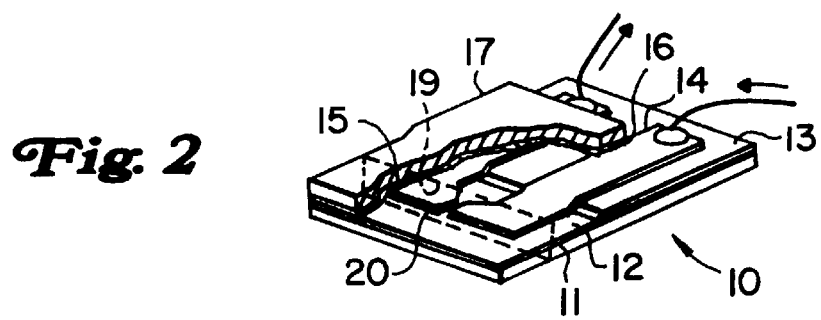
FIG. 2 is a perspective view of the magnetoresistive head of FIG. 1, with portions removed for clarity.
Figure 3:
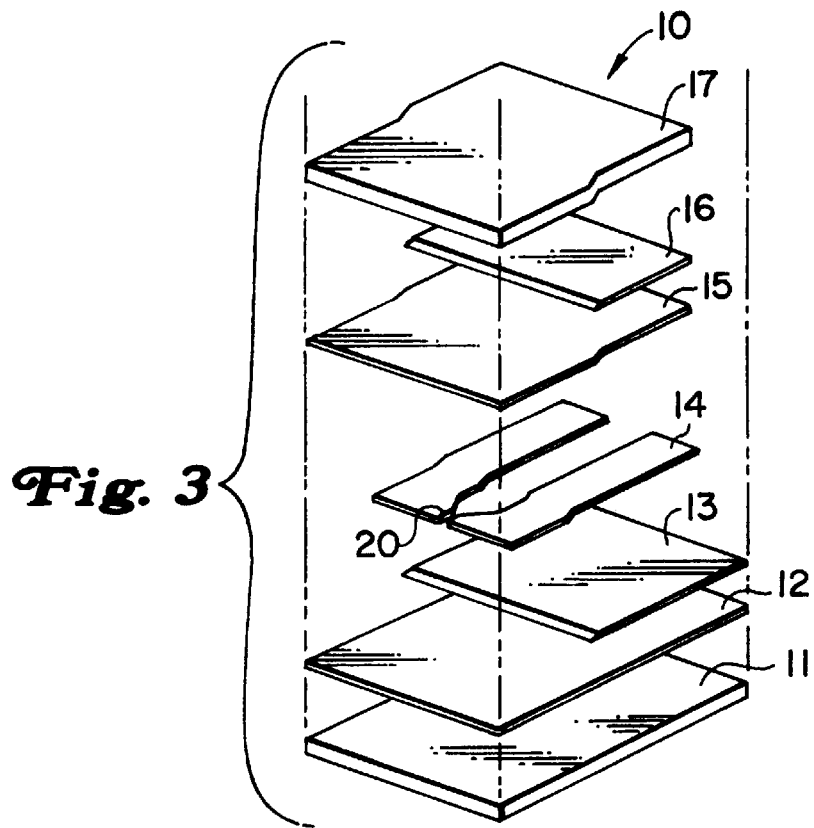
FIG. 3 is an exploded perspective elevational view of the magnetoresistive head of FIG. 1.

As seen in FIGS. 1–3, the magnetoresistive head 10, which is formed by a sputtering process on an insulation-film substrate (not shown), includes a bottom shield layer 11, a first gap layer 12, a first gap rise layer 13, a magnetoresistive element 20, a leader conductor layer 14, a second gap layer 15, a second gap rise layer 16, and a top shield layer 17. These layers are formed one on top of another in the order given.

The first gap rise layer 13 and the second gap rise layer 16 increase the laminate thickness to prevent short circuits that might be caused between the leader conductor layer 14 and the bottom shield layer 11 or the top shield layer 17 by way of pinholes in the first gap layer 12 or the second gap layer 15. During operation, the sense current $I_s$ is supplied to the leader conductor layer 14. Dotted line 19 in FIG. 1 indicates the floating level of the magnetoresistive effect head 10, and the head is polished up to this line by the completion of the manufacturing process.

The bottom shield layer 11 is composed of NiFe and has a thickness of approximately 1,000 nm. The first gap layer 12 is composed of $Al_2O_3$ and has thickness of approximately 100 nm, and the first gap rise layer 13 is also composed of $Al_2O_3$ and is approximately 300 nm thick. The leader conductor layer 14 is Ta and has a thickness of about 100 nm. The second gap layer 15 and the second gap rise layer 16 are composed of $Al_2O_3$ and are approximately 100 nm and 300 nm thick, respectively. The top shield layer 17 is composed of NiFe and has a thickness of about 1,000 nm. The substrate (not shown), on which the magnetoresistive head 10 is formed, is a 4 mm thick aluminum titanium carbide ($Al_2O_3 \cdot TIC$) covered with a 10 $\mu m$ aluminum ($Al_2O_3$) insulation film, for example.

Figures 4, 5:
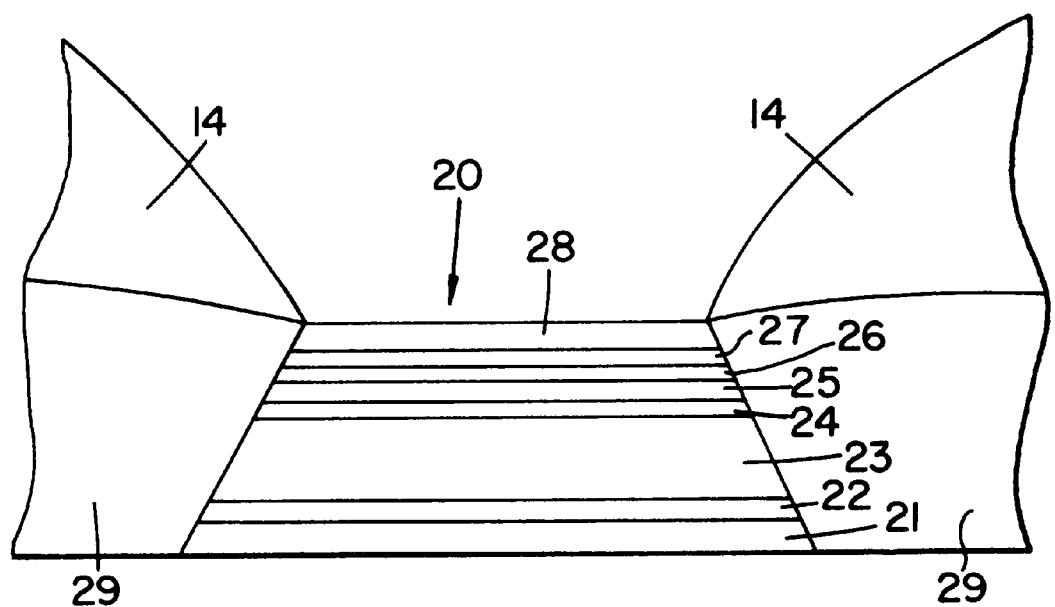
FIG. 4 is a front view of a magnetoresistive element made in accordance with the principles of this invention.
FIG. 5 is a diagram indicating the materials and thicknesses of the individual layers of the magnetoresistive element of FIG. 4.

The composition of the magnetoresistive element 20 and the thickness of each component are shown in FIGS. 4 and 5. FIGS. 4 and 5 show that the magnetoresistive element 20 includes a Ta bottom underlayer 21 having a thickness of approximately 5 nm. An underlayer 22 is preferably composed of NiFeCr and has a thickness of approximately 3 nm, but should be at least 1 nm. A PdPtMn anti-ferromagnetic layer 23 is approximately 25 nm, and a CoFeB pinned layer 24 is approximately 2.2 nm. Also included are a Cu intermediate layer 25 of approximately 3.2 nm, a CoFeB lower free layer 26 of approximately 2.5 nm, a NiFe upper free layer 27 of approximately 4 nm, and a Ta upper protective layer 28 of approximately 10 nm. These layers are formed one on top of another in the order given.

The magnetoresistive element 20 is 1 $\mu m$ wide (across track width) and has a total thickness of approximately 54.9 nm. Both ends of the magnetoresistive element 20 are laminated with a hard magnetic layer 29 and the leader conductor layer 14. The hard magnetic layer 29 is generally composed of CoCrPt and controls the magnetic directions of the lower and the upper free layers 26, 27.

The use of CoFeB for the pinned layer 24 and the lower free layer 26 is disclosed in commonly assigned U.S. patent application Ser. No. 783,464, filed Jan. 16, 1997, the disclosure of which is incorporated by reference herein. Alternatively, two layers of CoFe and NiFe alloys may also be used for the pinned and the free layer 24, 26. This is disclosed in commonly assigned U.S. patent application Ser. No. 649,125, filed May 14, 1996, the disclosure of which is also incorporated by reference herein. Further, the method of forming a magnetoresistive element by using organic and inorganic films for masking is disclosed in commonly assigned U.S. patent application Ser. No. 669,610, filed Jun. 24, 1996, the disclosure of which is incorporated by reference herein.

Figure 6:
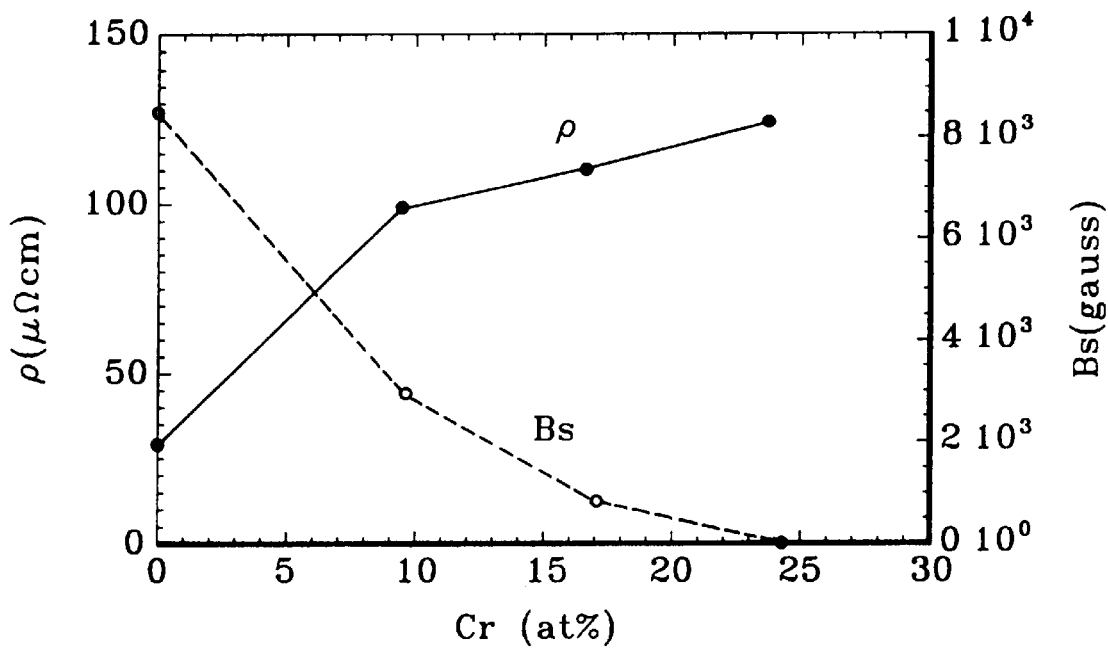
FIG. 6 is a graph showing the relationships between the Cr content of a NiFeCr underlayer and its resistivity $\rho$ and saturation magnetic flux density Bs.

FIG. 6 shows the relationships between the Cr content of the NiFeCr underlayer 22 and the resistivity $\rho$ and the saturation magnetic flux density Bs characteristics of the NiFeCr underlayer. With respect to the resistivity characteristics, FIG. 6 shows that the resistivity $\rho$ (shown in solid line) increases as the Cr content increases. For example, when the Cr of the underlayer 22 is zero, the resistivity is 23.4 $\mu\Omega cm$, and with only a 4 at % increase in the Cr content the resistivity jumps to 60 $\mu\Omega cm$, and at 17 at %, the resistivity is greater than 100 at $\mu\Omega cm$. As such, the Cr content of the underlayer 22 should at least be about 4 at %, more preferably, about 17 at % or more. In the preferred embodiment, the Cr content is 24.3 at %, i.e., the content of the preferred underlayer 22 is $(Ni_{80}Fe_{20})_{75.7}Cr_{24.3 at\ \%}$. At 24.3 at %, the resistivity becomes 120 $\mu\Omega cm$, which is at least five times the resistivity of zero Cr content. When the current diversion ratios of the pinned layer 24, the intermediate layer 25 and the lower free layer 26 that contribute to the magnetoresistive effect are calculated, the value obtained is 52.2% when the Cr content is zero, but is improved to 59.8% when the Cr content is 24.3 at %. This reduces the amount of current diverted to the anti-ferromagnetic layer 23 and the underlayer 22 that do not contribute to the magnetoresistive effect, and minimizes the current loss through these layers.

Regarding the characteristics of the saturation magnetic flux density Bs of the underlayer 22, FIG. 6 shows that the flux density Bs (shown in dotted line) decreases as the Cr content increases. For example, when the Cr content is at 4 at %, the saturation flux density Bs is approximately 6,000 gauss, and at the preferred Cr content of 24.3 at %, the flux density is zero. Lower saturation magnetic flux density Bs has less affect on the magnetic directions of the lower and the upper free layer 26, 27, which results in improved conventional bias characteristics of the magnetoresistive element. Accordingly, the Cr content should at least be about 4 at %.

Figure 7:
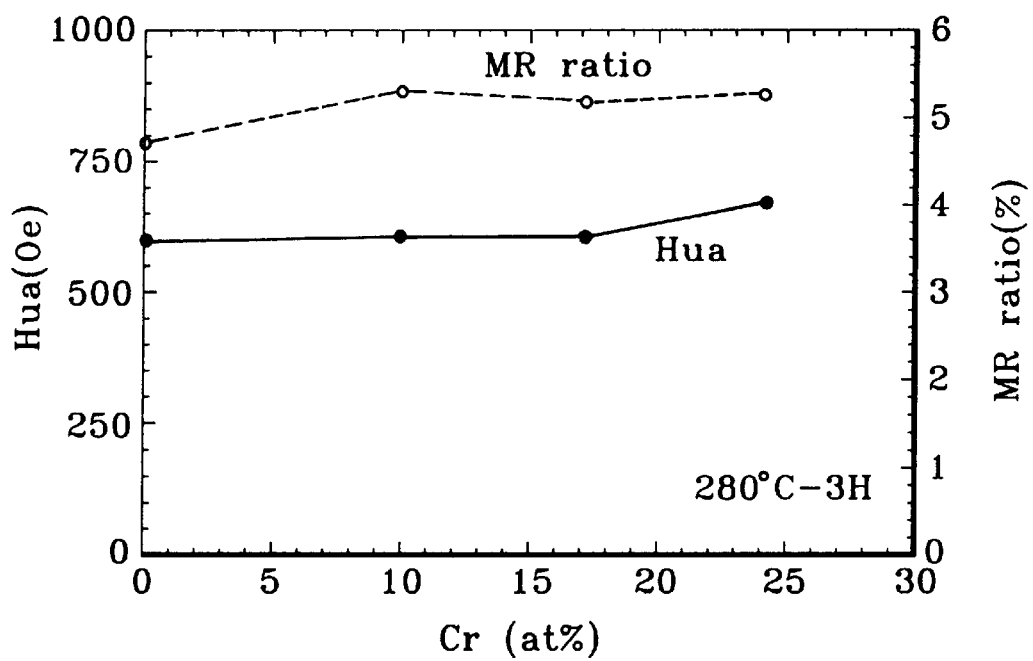
FIG. 7 is a graph showing the relationships between the Cr content of the NiFeCr underlayer and the uni-directional anisotropic magnetic field strength (Hua) and the magnetoresistive effect ratio of the magnetoresistive element of FIG. 4.

FIG. 7 shows the relationships between the Cr content of the NiFeCr underlayer 22 and the uni-directional anisotropic magnetic field strength (Hua) of the magnetoresistive element 20 and the magnetoresistive effect ratio (MR ratio). FIG. 7 shows that the addition of Cr to NiFe increases the Hua value and the MR ratio (the values of the Hua and the MR ratio were measured after the magnetoresistive element was annealed in the magnetic field at 280° C. for three hours). At the preferred Cr content of 24.3 at %, the Hua (shown in solid line) is increased to 670 (Oe) and the MR ratio (shown in dotted line) is increased to 5.3% from the Cr content of zero. This is a 14% increase in MR ratio and a similar increase in Hua, indicating that the characteristics of the magnetoresistive element 20 is improved with the increase in the Cr content.

Figure 8:
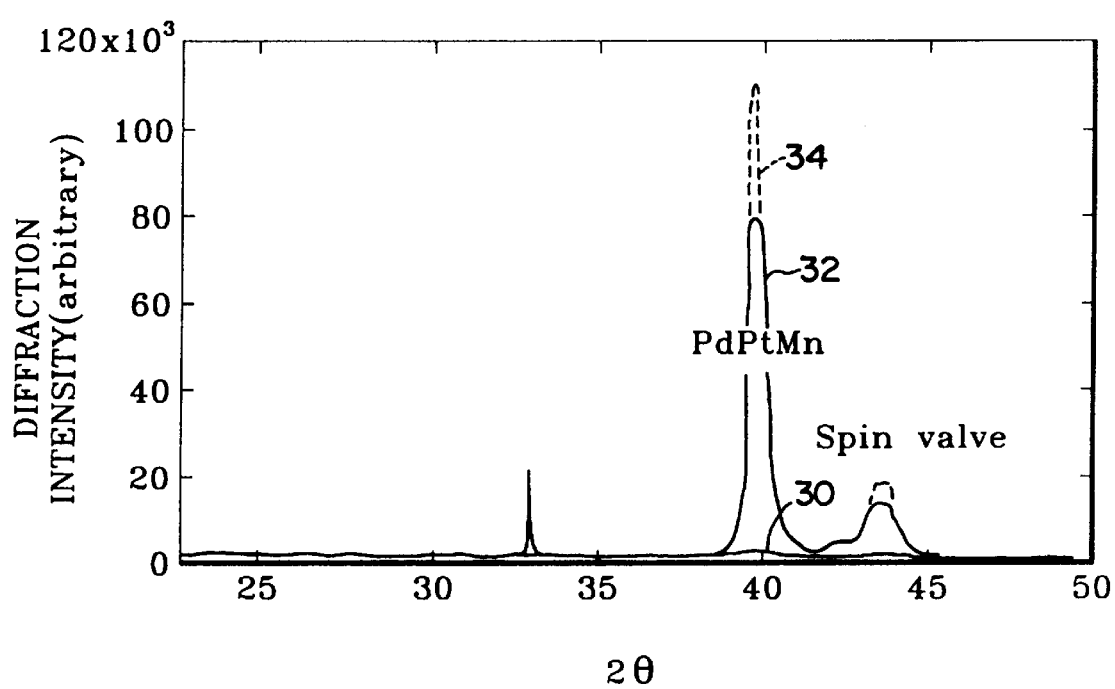
FIG. 8 is a graph showing the results of the analysis of the crystal structure of the magnetoresistive element of FIG. 4 by X-ray diffraction.

FIG. 8 shows the results of an X-ray analysis of three different crystal orientations of the magnetoresistive elements 20. Thin, bold and dotted lines 30, 32, 34 indicate the varying diffraction intensities of three types of underlayer arrangements obtained as the angle of X-ray incidence (2θ) is changed. The thin line 30 represents the diffraction intensity of the Ta bottom underlayer 21, and the bold line 32 represents the diffraction intensity of the combined Ta/NiFe underlayer arrangement (Ta bottom underlayer 21 and NiFe underlayer 22). The dotted line 34 represents the diffraction intensity of the Ta/NiFeCr underlayer arrangement (Ta bottom underlayer 21 and NiFeCr underlayer 22).

At 2θ=40, the PdPtMn ordered-alloy anti-ferromagnetic layer 23 has a large intensity, indicating that it has a correspondingly large FCC (face centered cubic) structure.

Comparatively, the intensity of a conventional spin-valve type magnetoresistive element is large at 2θ=44, but is much smaller than that of the PdPtMn layer 23. Thus, the FCC structure of the conventional magnetoresistive element is similarly smaller. It should be noted that the PdPtMn anti-ferromagnetic layer 23, which is initially composed of disordered-alloy and has little FCC structure, does not show an anti-ferromagnetic characteristic immediately after sputtering. Only after the PdPtMn layer 23 goes through an annealing process, in which the PdPtMn becomes an ordered-alloy and has the FCC structure, that an anti-ferromagnetic characteristic is displayed.

As shown by the thin line 30 at 2θ=40, the PdPtMn layer ordered-alloy anti-ferromagnetic layer 23 has little FCC structure when it is formed only on the Ta underlayer 21, but has more FCC structure when the anti-ferromagnetic layer is formed on the Ta/NiFe underlayer arrangement, as shown by the bold line 32. The dotted line 34 shows that the PdPtMn anti-ferromagnetic layer 23 has even more FCC structure, and accordingly, more anti-ferromagnetic characteristics, when it is formed on the Ta/NiFeCr underlayer arrangement.

While the present invention has been described in which the underlayer 22 comprises NiFeCr, it is should be understood that Cr in the NiFeCr underlayer 22 could be substituted with any of Nb, Rh, or Pd to obtain the same anti-ferromagnetic effect described above. The main component NiFe could also be replaced with only the Ni and still obtain the same results described above. Furthermore, using NiMn, PdMn, or PtMn instead of PdPtMn ordered-alloy for the anti-ferromagnetic layer 23 also shows the same result.

This invention is capable of decreasing the amount of current flowing to the anti-ferromagnetic layer and its underlayer that do not contribute to the magnetoresistive effect. This invention also improves the magnetically-switched connection characteristics of the anti-ferromagnetic layer while improving the bias characteristics of the magnetoresistive effect head. In this manner, this invention improves signal quality and enables high-density recording.

While the principles of the invention have been described above in connection with specific apparatus and applications, it is to be understood that this description is made only by way of example and not as a limitation on the scope of the invention.

What is claimed is:

1. A magnetoresistive head comprising:
   an underlayer composed of one of Ni and NiFe alloy and at least 17 atom percent of at least one additive selected from the group consisting of Cr, Nb, Rh, and Pd;
   an anti-ferromagnetic layer formed on said underlayer;
   a first ferromagnetic layer formed on said anti-ferromagnetic layer;
   a nonmagnetic layer formed on said first ferromagnetic layer; and
   a second ferromagnetic layer formed on said nonmagnetic layer.

2. A magnetoresistive head according to claim 1, wherein said underlayer is composed of NiFeCr alloy.

3. A magnetoresistive head according to claim 2, further comprising a seed layer composed of Ta formed on said underlayer.

4. A magnetoresistive head according to claim 1, wherein said underlayer contains 24.3 atom percent of said additive.

5. A magnetoresistive head according to claim 1, wherein said underlayer has a thickness of at least 1 nm.

6. A magnetoresistive head according to claim 5, wherein said underlayer has a thickness of approximately 3 nm.

7. A magnetoresistive head according to claim 1, wherein said anti-ferromagnetic layer is composed of one alloy selected from the group consisting of NiMn, PdMn, PtMn, and PdPtMn.

8. A magnetoresistive head according to claim 7, further comprising a seed layer composed of Ta formed on said underlayer.

9. A magnetoresistive head according to claim 1, further comprising a seed layer composed of Ta formed on said underlayer.

10. A magnetoresistive head comprising:
    an underlayer including NiFe and at least 17 atom percent of at least one additive selected from the group consisting of Cr, Nb, Rh, and Pd, and having a resistivity of at least 60 $\mu\Omega$cm and a maximum saturation magnetic flux density of approximately 6,000 gauss;
    an anti-ferromagnetic layer composed of PtMn ordered-alloy formed on said underlayer;
    a first ferromagnetic layer formed on said anti-ferromagnetic layer;
    a nonmagnetic layer formed on said first ferromagnetic layer; and
    a second ferromagnetic layer formed on said nonmagnetic layer.

11. A magnetoresistive head according to claim 10, wherein said underlayer is composed of NiFeCr alloy.

12. A magnetoresistive head according to claim 11, whereon said Cr is in a range from 17 to 24.3 atom percent.

13. A magnetoresistive head according to claim 11, wherein said Cr is 24.3 atom percent.

14. A magnetoresistive head comprising:
    a first underlayer composed of Ta;
    a second underlayer composed of NiFeCr alloy formed on said first underlayer said NiFeCr having at least 17 atom percent of Cr;
    an anti-ferromagnetic layer composed of PtMn ordered-alloy formed on said second underlayer;
    a first ferromagnetic layer formed on said anti-ferromagnetic layer;
    a nonmagnetic layer formed on said first ferromagnetic layer; and
    a second ferromagnetic layer formed on said nonmagnetic layer.

15. A magnetoresistive head according to claim 14, wherein said NiFeCr has 24.3 atom percent of Cr.

16. A magnetoresistive head comprising:
    an underlayer composed of one of Ni and NiFe alloy and 17 to 24.3 atom percent of at least one additive selected from the group consisting of Cr, Nb, Rh, and Pd;
    an anti-ferromagnetic layer formed on said underlayer;
    a first ferromagnetic layer formed on said anti-ferromagnetic layer;
    a nonmagnetic layer formed on said first ferromagnetic layer; and
    a second ferromagnetic layer formed on said nonmagnetic layer.

* * * * *